(12) United States Patent
Shimizu

(10) Patent No.: US 8,419,407 B2
(45) Date of Patent: Apr. 16, 2013

(54) EXTRUDER

(75) Inventor: Mitsuaki Shimizu, Aso (JP)

(73) Assignee: NOK Corporation, Tokyo (JP)

( * ) Notice: Subject to any disclaimer, the term of this patent is extended or adjusted under 35 U.S.C. 154(b) by 427 days.

(21) Appl. No.: 12/681,278

(22) PCT Filed: Oct. 2, 2008

(86) PCT No.: PCT/JP2008/067949
§ 371 (c)(1),
(2), (4) Date: Apr. 1, 2010

(87) PCT Pub. No.: WO2009/044823
PCT Pub. Date: Apr. 9, 2009

(65) Prior Publication Data
US 2010/0272841 A1    Oct. 28, 2010

(30) Foreign Application Priority Data
Oct. 5, 2007 (JP) .................................. 2007-262034

(51) Int. Cl.
*B29C 47/10* (2006.01)
(52) U.S. Cl. ..................... 425/190; 425/376.1; 366/76.5
(58) Field of Classification Search ................. 425/113, 425/190, 376.1; 366/76.5
See application file for complete search history.

(56) References Cited

U.S. PATENT DOCUMENTS

| 4,718,770 A * | 1/1988 | Christy ........................... 366/71 |
| 7,160,099 B2 * | 1/2007 | Radovich et al. .............. 425/447 |
| 2002/0089082 A1 * | 7/2002 | Brussel ......................... 264/239 |
| 2005/0226093 A1 * | 10/2005 | Yada et al. ...................... 366/71 |

FOREIGN PATENT DOCUMENTS

| JP | 55-083331 A | 6/1980 |
| JP | 55-083331 U | 6/1980 |
| JP | 63-299914 A | 12/1988 |
| JP | 07-186233 A | 7/1995 |
| JP | 2000-225640 A | 8/2000 |
| JP | 2001-071369 A | 3/2001 |

* cited by examiner

*Primary Examiner* — James Sanders
(74) *Attorney, Agent, or Firm* — Harness, Dickey & Pierce, P.L.C.

(57) ABSTRACT

An extruder that can be cleaned more easily. An extruder in which a material is supplied from a supply opening (21) of a circular tube section (20), the material is sent to a conveyance passage while the material on the surface of a feed roller (4) is scraped by a scraper (5) through rotation of a screw (3) and the feed roller (4). The extruder has a feed roller support portion (23) rotatably supporting the feed roller (4) and installed so that the feed roller (4) can open and close the circular tube section (20) in such a way that the feed roller (4) separates from the screw (3) to open the inner space of the circular tube section (20).

4 Claims, 5 Drawing Sheets

EXTRUDER

TECHNICAL FIELD

The present invention relates to an extruder that kneads and mixes a material such as a rubber material and extrudes the material.

BACKGROUND

A conventional extruder that kneads and mixes a material such as a rubber material and extrudes the material is disclosed in, for example, Japanese Utility Model Application Laid-Open No. 55-83331.

With reference to FIGS. 4A and 4B and FIG. 5, a conventional extruder will be described. FIGS. 4A and 4B are schematic diagrams for explaining the configuration of a conventional extruder. FIG. 4A is a schematic cross section of the extruder, and FIG. 4B is a cross section taken along line X-X of FIG. 4A. FIG. 5 is a diagram for explaining a foreign matter mixing mechanism and is a schematic perspective view of a scraper.

An extruder 100 has a housing 101 including a circular tube section 101a, a supply opening 101b provided on one of end sides of the circular tube section 101a, and an exhaust opening 101c provided on the end opposite to the supply opening 101b. A screw 102 is rotatably assembled in the circular tube section 101a. A feed roller 103 (FIG. 4B) is provided adjacent to and in parallel to a supply part 102a of the screw 102. The feed roller 103 is assembled in the housing 100 rotatably in a direction opposite to the rotation direction of the screw 102. A scraper 104 is attached on the side opposite to the supply opening 101b across the screw 102 and the feed roller 103.

The material such as a rubber material is supplied via the supply opening 101b of the housing 101 to the supply part 102a of the screw 102. The material supplied to the supply part 102a is fed to a material conveyance passage formed by the outer peripheral surface of the screw 102 and the inner peripheral surface of the circular tube section 101a by rotation of the screw 102 and the feed roller 103. The material fed to the material conveyance passage is kneaded by the rotation of the screw 102 and extruded from the exhaust opening 101c.

The scraper 104 includes a scraping part 104a having a pointed shape in cross section and a guide surface 104b continued from the scraping part 104a to the inner peripheral surface of the circular tube section 101a. The scraper 104 is constructed to scrape the material from the surface of the feed roller 103 by the tip of the scraping part 104a.

The scraper 104 is attached to an attachment face 101d provided on the side opposite to the supply opening 101b of the housing 101 by a fastener 105 such as a bolt.

Preferably, an attachment face 104c of the scraper 104 which is in contact with the attachment face 101d is attached tightly without a gap to the attachment face 101d in consideration of leakage of the material. In many cases, however, such an attachment face 101d is formed as a part of the housing 101. Due to limitation in processing accuracy, a gap is formed between the attachment face 101d of the housing 101 and the attachment face 104c of the scraper 104.

As shown in FIG. 5, a material 107a which enters the gap is fixed in the gap and is pushed out from the gap to the material conveyance passage side by a part 107b of the following material which is newly supplied and enters the gap. The pushed part 107c from the gap in the fixed material is mixed in the following material, so that the fixed material is mixed as a foreign matter in the following material pushed from the exhaust opening 101c (foreign matter mixture).

To prevent such foreign matter mixture, for each work, it is necessary to disassemble the extruder 100, detach the scraper 104, and do the cleaning. However, a not-shown flange provided at an end on the root side (the supply opening 101b side) of the circular tube section 101a is fixed by being fastened by a fastener such as a bolt to the side of a drive mechanism having a power source of the screw 102 and a reducer. The feed rotor 103 is also fixed by a fastener such as a bolt. Therefore, the work of disassembling the extruder 100 is very troublesome.

Further, the gap between the tip of the scraping part 104a of the scraper 104 and the surface of the feed roller 103 has to be adjusted to a small interval of about 0.05 mm. If such adjustment of the gap interval is performed for each cleaning, the work time becomes very long.

On the other hand, as a countermeasure against leakage of the material to the gap in the attachment face of the scraper 104, a method for sealing the contact faces of the scraper 104 and an attachment part 106 by a seal member such as an O-ring is considered. However, adhesion is not assured in the position of attachment of the seal member, so that the material enters.

There is also a method for making a rubber sheet packing, a metal sheet packing, or the like interposed on the contact face, applying a curable liquid gasket to the contact face, or the like. In the case of the rubber sheet packing, a piece of the deteriorated packing is mixed as a foreign matter. In the case of the metal sheet packing, a metal powder generated due to abrasion is mixed as a foreign matter. In the case of the liquid gasket, a piece of the deteriorated gasket is mixed as a foreign matter.

The present invention has been achieved to solve the drawback of the conventional techniques, and an object of the invention is to provide an extruder with improved efficiency of a cleaning work.

SUMMARY

To achieve the object, an extruder of the invention includes a housing having a circular tube section provided with a supply opening and an exhaust opening for a material, a screw rotatably assembled in the circular tube section, conveying the material supplied from the supply opening to the exhaust opening while kneading the material between itself and an inner peripheral surface of the circular tube section, and extruding the material, a feed roller assembled in parallel to and adjacent to the screw near the supply opening, rotating together with the screw, and feeding the material supplied from the supply opening toward the exhaust opening, and a scraper having a scraping part that scrapes the material from the surface of the feed roller, and a guide surface that guides the scraped material to the inner peripheral surface of the circular tube section, wherein the housing has a feed roller support portion that rotatably supports the feed roller and that is assembled so as to make operation of opening/closing the circular tube section performed in such a way that the feed roller moves apart from the screw to open the hollow in the cylinder part, and the scraper is attached to the feed roller support portion so as to open a border between the guide surface and the inner peripheral surface of the cylinder part at the time of opening operation of the feed roller support portion.

With such a configuration, since the feed roller support portion is open, the material entering between the scraper and the circular tube section can be removed. That is, it is unnecessary to detach the scraper in the cleaning work. Therefore, it is unnecessary to readjust the gap between the tip of the scraping part of the scraper and the surface of the feed roller, so that the work process of the cleaning work is simplified, and the work time can be shortened.

A drive mechanism for supporting and rotating the screw may be further provided. The circular tube section is provided so that it can move apart from the drive mechanism in the axial direction of the screw.

With such a configuration, by making the circular tube section move apart from the drive mechanism, the screw can be exposed to the outside from the circular tube section. Thus, cleaning such as removal of a material adhered to the outer peripheral surface of the screw and the inner peripheral surface of the circular tube section forming a material conveyance passage is facilitated.

As described above, by the present disclosure, efficiency of a cleaning work is improved.

Figure 1A:
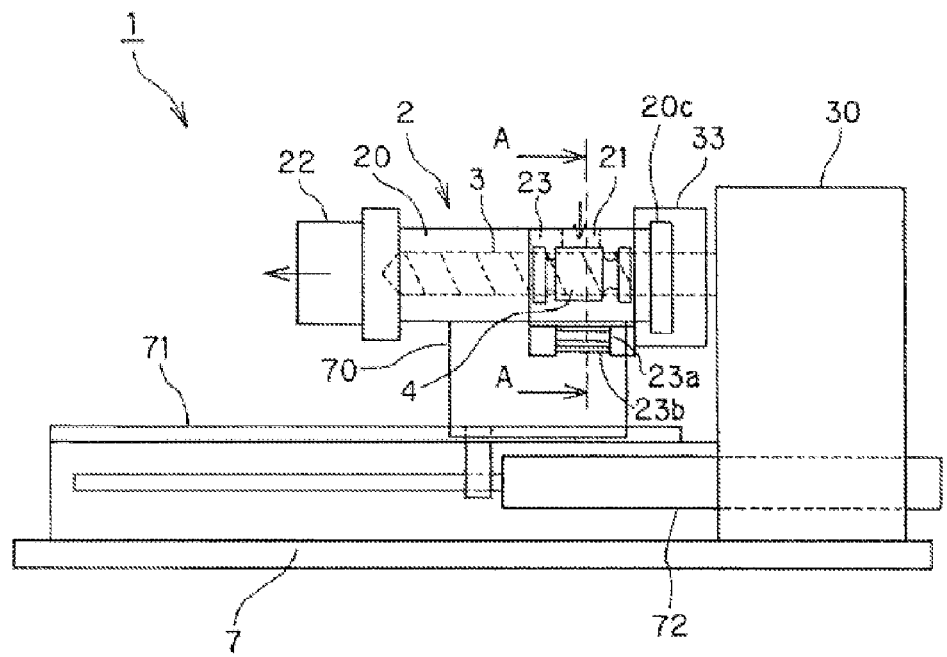
FIGS. 1A and 1B are schematic diagrams of an extruder according to an embodiment.

EXPLANATIONS OF REFERENCE NUMERALS 1 extruder
2 housing
20 circular tube section
20a inner peripheral surface
20b contact face
21 supply opening
22 exhaust opening
23 feed roller support portion
23a fulcrum shaft
23b drive device
23c retaining and fixing device
3 screw
30 drive mechanism
31 supply part
32 exhaust part
4 feed roller
5 scraper
51 scraping part
52 guide surface
53 contact face
6 fastener
7 linear motion mechanism
70 slide block
71 slide rail
72 hydraulic cylinder

DETAILED DESCRIPTION

With reference to the drawings, a best mode for carrying out the invention will be described illustratively and specifically hereinbelow based on an embodiment. Unless otherwise specified, the scope of the present invention is not limited to the dimensions, materials, shapes, relative dispositions, and the like of components described in the embodiment.

Figure 1B:
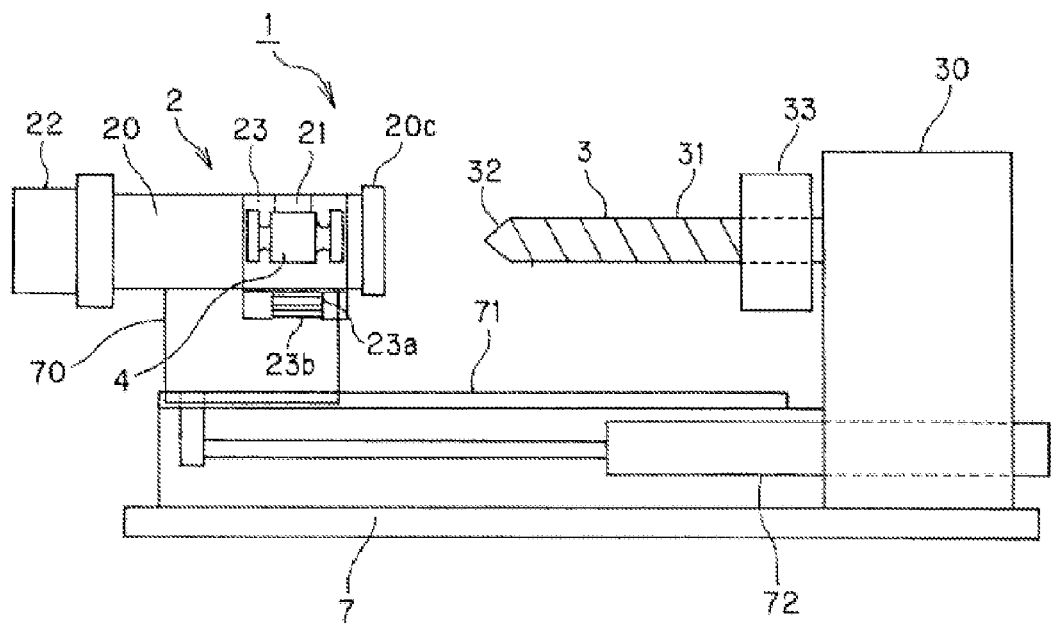
Figure 2A:
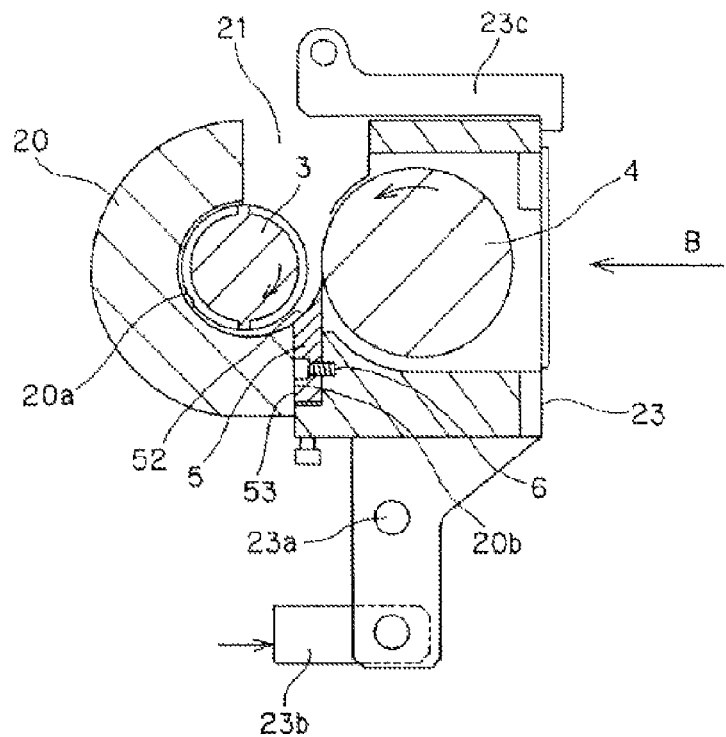
FIGS. 2A and 2B are schematic cross sections of the extruder according to the embodiment.
Figure 2B:
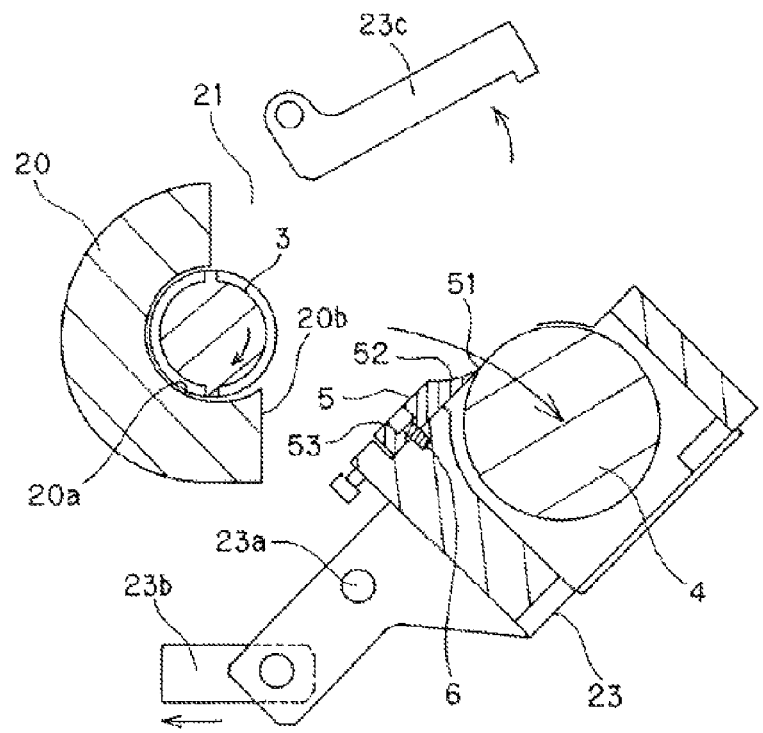
Figure 3:
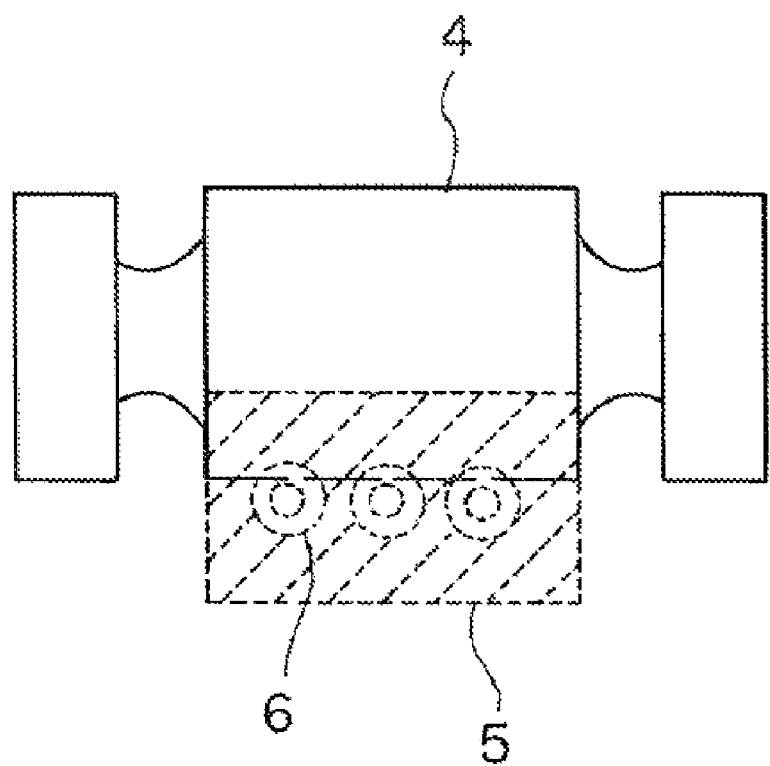
FIG. 3 is a schematic diagram of a feed roller and a scraper.
Figures 4A, 4B:
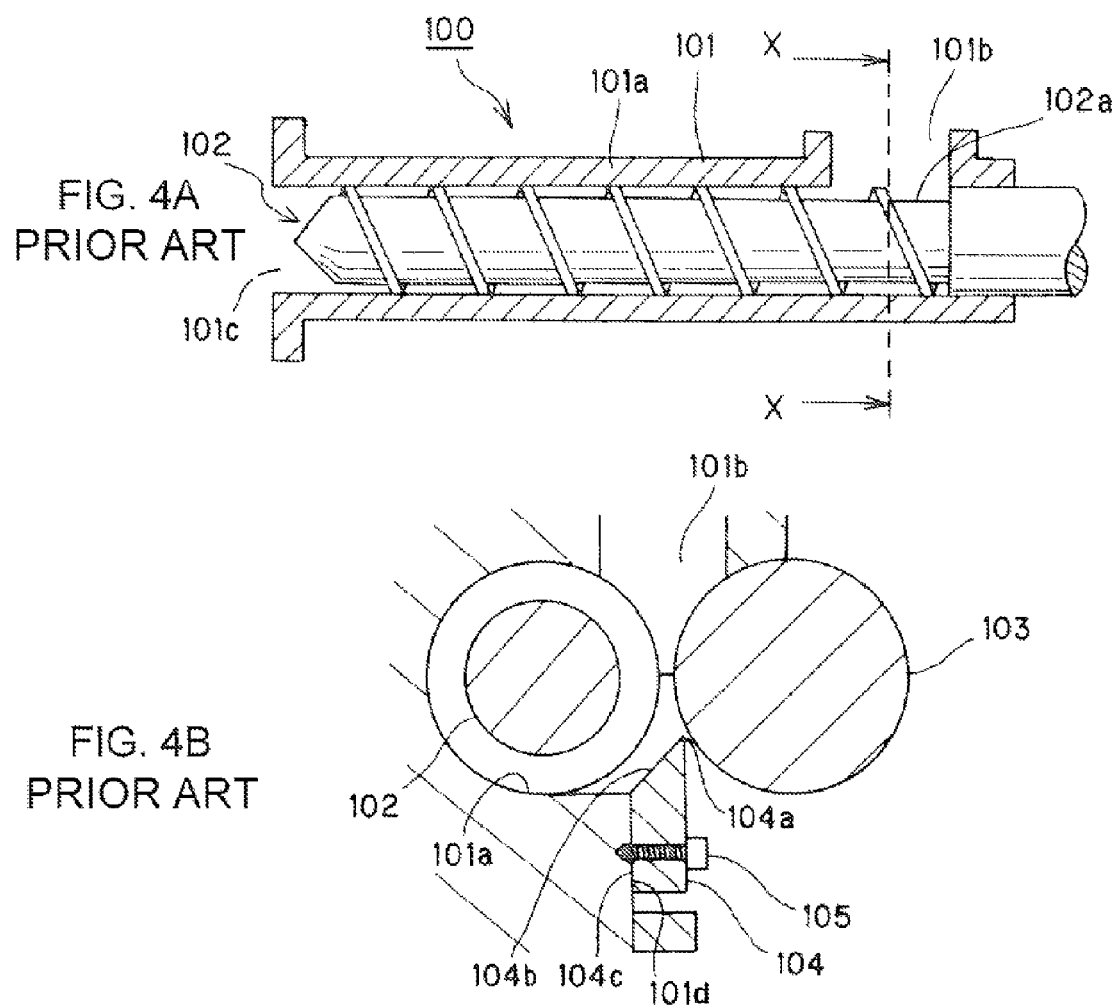
FIGS. 4A and 4B are schematic diagrams for explaining the configuration of an extruder according to a conventional technique.
Figure 5:
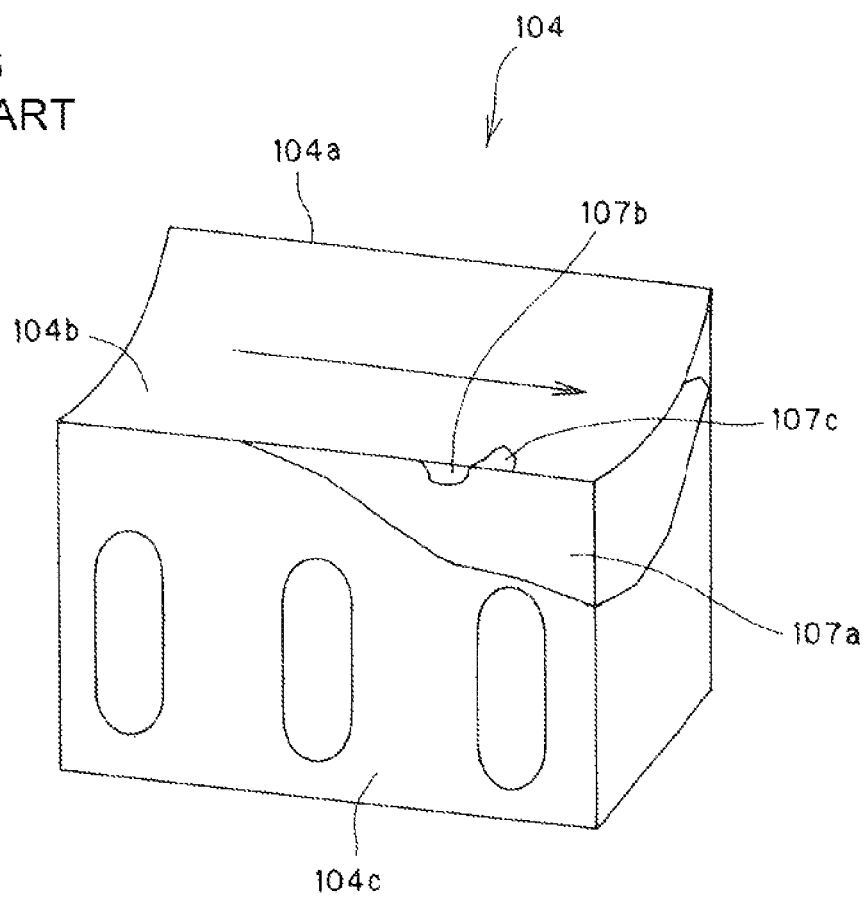
FIG. 5 is a schematic perspective view of a scraper according to a conventional technique.

With reference to FIGS. 1A and 1B to FIG. 3, an extruder according to the embodiment of the invention will be described. FIGS. 1A and 1B are schematic diagrams showing the configuration of the extruder according to the embodiment. FIG. 1A shows a state before a circular tube section is moved. FIG. 1B shows a state after the circular tube section is moved. FIGS. 2A and 2B are schematic cross sections taken along line A-A of FIG. 1A. FIG. 2A shows a state where a feed roller support portion is closed. FIG. 2B shows a state where the feed roller support portion is open. FIG. 3 is a schematic diagram showing the configuration of a feed roller and a scraper viewed from the arrow B of FIG. 2A.

An extruder 1 according to the embodiment includes, roughly, a housing 2, a screw 3, a feed roller 4, and a scraper 5 and is an apparatus for kneading, mixing, and extruding a material such as a rubber material. The use of the extruder is not limited to extrusion molding or the like of a rubber material or the like but is also suitable to extruding of food, chemicals, and the like.

The housing 2 includes a circular tube section 20, a supply opening 21 which opens in a direction almost orthogonal to the axial direction of the circular tube section 20 at one of ends of the circular tube section 20, and an exhaust opening 22 which opens in the axial direction of the circular tube section 20 at the other end of the circular tube section 20. The screw 3 is rotatably assembled in the circular tube section 20. A feed roller support portion 23 that rotatably supports the feed roller 4 is assembled so that the hollow in the circular tube section 20 can be opened/closed near the supply opening 21.

The screw 3 has a configuration that a screw thread or a spiral groove is formed in a shaft part and is provided so as to be supported and rotated by a drive mechanism 30 disposed adjacent to one of ends of the circular tube section 20. The root side of the shaft part of the screw 3 serves as a supply part 31 facing the supply opening 21 of the housing 2, and the tip side of the screw 3 serves as an exhaust part 32 facing the exhaust opening 22 of the housing 2.

The feed roller 4 is an almost-cylindrical-shaped member provided parallel to and adjacent to the supply part 31 of the screw 3 and is rotatably supported by the feed roller support portion 23 in a position facing the supply opening 21 of the housing 2 in a manner similar to the supply part 31 of the screw 3. The feed roller 4 is rotated in a direction opposite to the rotating direction of the screw 3 by a not-shown power source. As the power source of the feed roller 4, a conventional electric motor or the like may be properly employed.

The scraper 5 is attached on the side opposite to the supply opening 21 of the housing 2 across the supply part 31 of the screw 3 and the feed roller 4. The scraper 5 has a scraping part 51 having a pointed shape in section and protruding close to the surface of the feed roller 4 and a guide surface 52 continued from the scraping part 51 to an inner peripheral surface 20a of the circular tube section 20. The scraper 5 scrapes the material from the surface of the feed roller 4 with the tip of the scraping part 51, and guides the scraped material to the inner peripheral surface 20a of the circular tube section 20 by the guide surface 52.

The material such as a rubber material is supplied from the supply opening 21 of the housing 2 to the supply part 31 of the screw 3. The material supplied to the supply part 31 is fed between the screw 3 and the feed roller 4 by the rotation of the screw 3 and the feed roller 4 and transmitted to a material conveyance passage formed by the outer peripheral surface of the screw 3 and the inner peripheral surface 20a of the circular tube section 20. The transmitted material is conveyed while being kneaded and mixed by the rotation of the screw 3 toward the exhaust opening 22 and is extruded from the exhaust opening 22.

The feed roller support portion 23 is provided swingably about a fulcrum shaft 23a as a center extending in the axial direction below the feed roller 4. By the swing of the feed roller support portion 23, the hollow in the circular tube section 20 is opened/closed. The opening/closing operation of the feed roller support portion 23 is performed by a drive device 23b made by an electric motor, a hydraulic cylinder, and the like which are not shown. In a state where the feed roller support portion 23 is closed (FIG. 2A), the closed state is fixed by a retaining and fixing device 23c provided above the circular tube section. With the configuration, the feed roller support portion 23 is prevented from being opened by the pressure of the material supplied from the supply opening 21. The operation of opening the feed roller support portion 23 is performed in such a manner that the retaining state by the retaining and fixing device 23c is released, and the drive device 23b pulls the end of the feed roller support portion on the side opposite to the feed roller 4 across the fulcrum shaft 23a, thereby making the feed roller 4 side of the feed roller support portion rotate so as to be separate from the circular tube section 20 (screw 3). In such a manner, the hollow in the circular tube section 20 is open.

The scraper 5 is attached to the feed roller support portion 23 by a fastener 6 such as a bolt or the like at the border (joined part) between the circular tube section 20 and the feed roller support portion 23 on the side opposite to the supply opening 21. Therefore, a contact face 53 of the scraper 5 and a contact face 20b of the circular tube section 20 are apart from each other by the opening operation of the feed roller support portion 23 and exposed to the outside. Consequently, the material entering the border between the guide surface 52 of the scraper 5 and the inner peripheral surface 20a of the circular tube section 20 can be easily removed. That is, the material adhered to the contact face 53 of the scraper 5 and the contact face 20b of the circular tube section 20 can be directly taken out or wiped out by a hand of an operator. Since it is unnecessary to detach the scraper 5 each time the material removing work is done, the performance of the cleaning work improves.

In particular, the scraper 5 is attached so that the gap between the tip of the scraping part 51 and the surface of the feed roller 54 becomes preferably about 0.05 mm. Since the work of detaching/attaching the scraper 5 becomes unnecessary, the work efficiency largely improves. The size of the gap between the tip of the scraping part 51 and the surface of the feed roller 4 is properly set according to the specifications and the like of the extruder in a range that the leak amount of the material from the gap is minimized and, even when the volume expansion or the like occurs in the feed roller 4 and the scraper 5 due to the influence of heat generation or the like of the material, the tip of the scraping part 51 and the surface of the feed roller 4 do not come into contact with each other. High attachment precision is required.

The circular tube section 20 can move apart in the axis direction along the extending direction of the screw 3 from the drive mechanism 30 by a linear motion mechanism including a slide block 70, a slide rail 71, and a hydraulic cylinder 72. Specifically, the circular tube section 20 and the feed roller support portion 23 are mounted on the slide block 70. By sliding of the slide block 70 along the slide rail 71 in the axial direction by the power of the hydraulic cylinder 72, the circular tube section 20 moves apart from the drive mechanism 30 mounted on one end of the linear motion mechanism 7 and the screw 3 supported by the drive mechanism 30. The configuration of the linear motion mechanism 7 is not limited to the above. Various conventional configurations may be properly employed.

The slide block 70 can be slid to a position where the entire screw 3 is completely exposed from the circular tube section 20. Consequently, the outer peripheral surface of the screw 3 and the inner peripheral surface of the circular tube section 20 which form the material conveyance passage can be easily cleaned.

In normal use of the extruder 1, the circular tube section 20 is fixed to the drive mechanism 30 in such a manner that the flange 20c provided at an open end on the side (the supply opening 21 side) opposite to the end at which the exhaust opening 22 is provided is locked by an open/close locking mechanism 33 provided at the root portion of the screw 3. At the time of a cleaning work, by unlocking the open/close locking mechanism 33, the circular tube section 20 becomes slidable. Therefore, as compared with a conventional extruder in which the circular tube section and the drive mechanism are fastened by a bolt or the like, the extruder can be easily disassemble for cleaning, and the efficiency of the cleaning work improves. As the open/close lock mechanism 33, conventional mechanisms may be properly employed such as a mechanism of an open/close lock type using a hydraulic cylinder as a power.

As described above, in the embodiment, the components for conveying the material can be easily disassembled, and the work of cleaning the components becomes easier. Therefore, it becomes easier to prevent occurrence of foreign matter mixture that a material which has entered a gap between the components and has fixed is mixed in the following material and is extruded. Since the components can be easily disassembled, check and repair in the apparatus is facilitated, and the maintenance performance improves.

The invention claimed is:

1. An extruder comprising:
   a housing having a circular tube section provided with a supply opening and an exhaust opening for a material;
   a screw rotatably assembled in the circular tube section, conveying the material supplied from the supply opening to the exhaust opening while kneading the material between itself and an inner peripheral surface of the circular tube section, and extruding the material;
   a feed roller assembled in parallel to and adjacent to the screw near the supply opening, rotating together with the screw, and feeding the material supplied from the supply opening toward the exhaust opening; and
   a scraper having a scraping part that scrapes the material from the surface of the feed roller, and a guide surface that guides the scraped material to the inner peripheral surface of the circular tube section,
   wherein the housing has a feed roller support portion that rotatably supports the feed roller and that is assembled so as to make operation of opening/closing the circular tube section performed in such a way that the feed roller moves apart from the screw to open the hollow in the cylinder part, and
   the scraper is attached to the feed roller support portion so as to open a border between the guide surface and the inner peripheral surface of the cylinder part at the time of opening operation of the feed roller support portion.

2. The extruder according to claim 1, further comprising a drive mechanism for supporting and rotating the screw,
   wherein the circular tube section is provided so as to move apart from the drive mechanism in the axial direction of the screw.

3. The extruder according to claim 1, wherein the feed roller support portion is pivotably movable about a fulcrum shaft.

4. The extruder according to claim 3, further comprising a retaining device that in an engaged position with the feed roller support portion secures the feed roller support portion in a closed position and in a disengaged position allows the feed roller support portion to be pivoted to an open position for cleaning.

* * * * *